No. 863,383.

PATENTED AUG. 13, 1907.

C. GRABE.
TAPPING MACHINE.
APPLICATION FILED MAR. 19, 1906.

Witnesses:
E. F. Wilson
Chas. E. Gorton.

Inventor:
Conrad Grabe
By Rudolph M. ...
Attorney.

UNITED STATES PATENT OFFICE.

CONRAD GRABE, OF SOLLITT, ILLINOIS.

TAPPING-MACHINE.

No. 863,383.     Specification of Letters Patent.     Patented Aug. 13, 1907.

Application filed March 19, 1906. Serial No. 306,926.

*To all whom it may concern:*

Be it known that I, CONRAD GRABE, a citizen of the United States, residing at Sollitt, in the county of Kankakee and State of Illinois, have invented certain new and useful Improvements in Tapping-Machines; and I do hereby declare the following to be a full, clear, and exact description of the invention, such as will enable others skilled in the art to which it appertains to make and use the same.

My invention relates to a novel construction in a tapping machine particularly intended for use by horseshoers in tapping shoes to receive calks in slippery weather, the object being to provide a simple and efficient device of this character and consists in the features of construction and combinations of parts hereinafter fully described and claimed.

Figure 1:
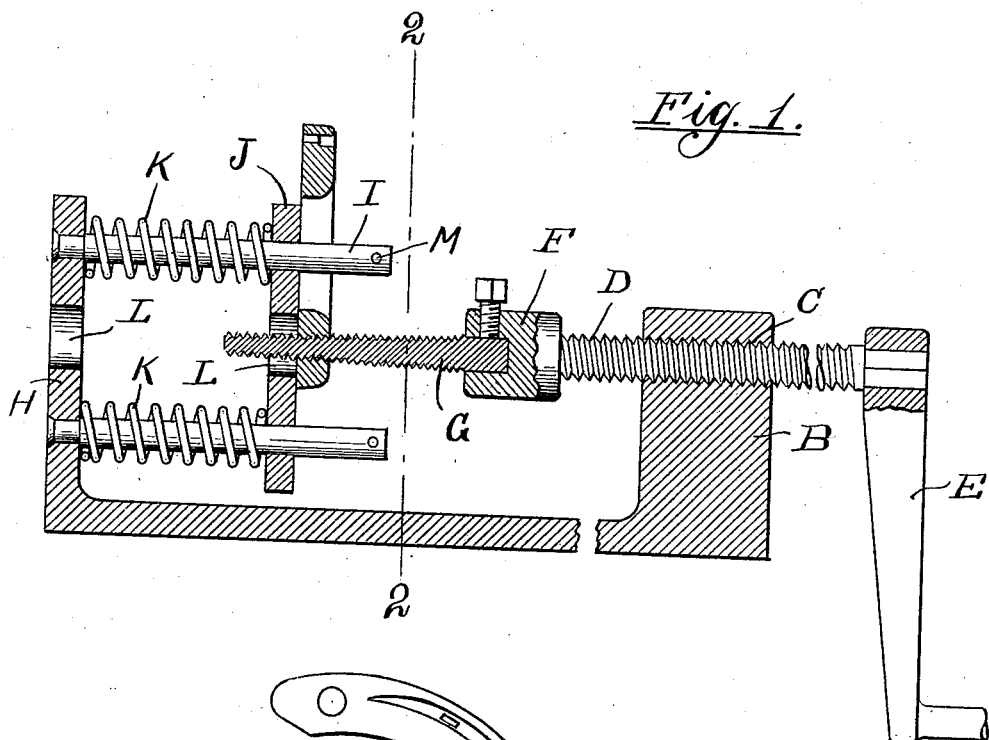
Figure 2:
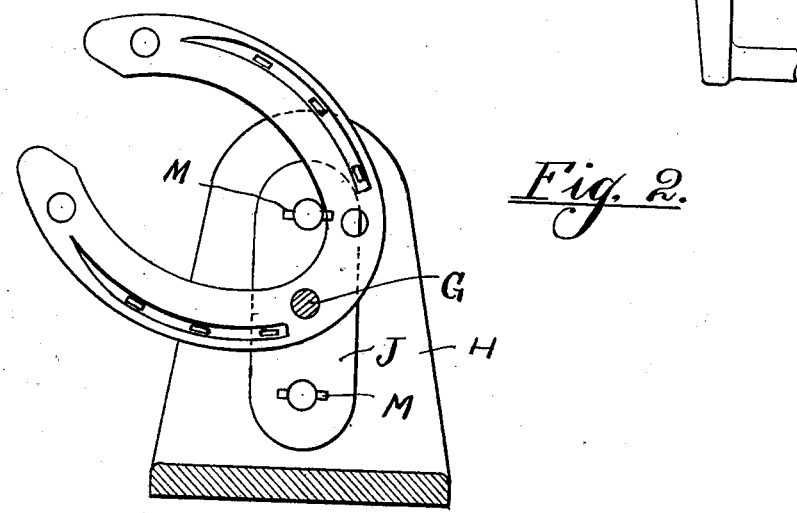

In the accompanying drawings illustrating my invention: Figure 1 is a central vertical longitudinal section of a machine constructed in accordance with my invention. Fig. 2 is a section of same on the lines 2—2 of Fig. 1.

My said machine comprises a U-shaped frame A one arm of which is relatively thick and heavy and is provided with a threaded opening C in which the screw shaft D is received, the latter carrying a crank E at one end and a chuck F at its other end in which the tap G is adapted to be received. Mounted in the other arm H of said frame are two parallel guide rods I which are likewise disposed parallel with the axis of said screw-shaft D. Movable longitudinally on said guide rods I is a plate J on which the work is adapted to be supported and which is normally held at the outward limit of its movement relatively to the arm H by means of the spiral springs K disposed on said rods I between the arm H and said plate J. Said arm H and plate J are each provided with an opening L in the path of said tap G through which the latter is adapted to pass. In the free ends of said guide rods I, I provide cross heads or pieces M which serve to limit the outward movement of said plate J.

In use the horseshoe or other work to be tapped is placed upon said plate J and said screw-shaft D turned until the tap G enters the opening in said work to be tapped. It is essential that the thread of said screw-shaft D shall be less to the inch than the largest thread to be cut by means of this device so that as tapping proceeds pressure will be exerted upon the work which will cause said plate J to move against the action of said springs K. The said springs will obviously serve to maintain the work supported thereby, compressing against the end of the tap until the latter takes hold, thus serving to relieve the operator of the necessity of exerting pressure on the tap to force a hold on the work. The said guide rods I also serve to prevent the work being tapped from being revolved by said tap.

My said machine is very simple and will serve all the purposes of a blacksmith or other mechanic whose requirements for a machine of this character are limited.

I claim as my invention:

1. In a tapping machine, the combination with a spring supported work-table, of a screw-shaft disposed above said work-table in a part of the frame and carrying the tap, said screw-shaft having fewer threads per inch than said tap is adapted to cut, whereby when said shaft is turned to tap work supported on said table, the latter will be forced downwardly to a degree determined by the difference in pitch of the threads of said tap and said shaft.

2. In a tapping machine, the combination with a spring supported work-table, and guides disposed in operative relation thereto, of a screw-shaft supported in a threaded sleeve above said work-table, a chuck thereon a tap secured therein, and means for turning said shaft, the threads of the latter having greater pitch than said tap so that as said shaft moves downwardly said work-table will be forced downwardly against the action of said springs a distance determined by the difference in pitch between the threads of said shaft and said tap and the number of revolutions imparted to said shaft.

In testimony whereof I have signed my name in presence of two subscribing witnesses.

CONRAD GRABE.

Witnesses:
    RUDOLPH WM. LOTZ,
    E. F. WILSON.